UNITED STATES PATENT OFFICE.

PATRICK RION, OF CHICAGO, ILLINOIS.

REMEDIAL COSMETIC.

SPECIFICATION forming part of Letters Patent No. 450,038, dated April 7, 1891.

Application filed September 17, 1890. Serial No. 365,281. (No specimens.)

*To all whom it may concern:*

Be it known that I, PATRICK RION, of Chicago, in the county of Cook and State of Illinois, have invented a new and useful Compound for the Treatment of the Skin, of which the following is a full, clear, and exact description.

This invention consists in a composition of matter for the treatment or toning and freshening of the human skin, which is non-poisonous in its nature, and does not check or obstruct perspiration through or from the pores of the skin.

The composition is composed of the following ingredients, substantially in or about the proportions stated: cow's milk, one tumblerful; spirits of ammonia, one tea-spoonful; whisky, one tea-spoonful; good soap, broken, one teaspoonful. These several ingredients are all thoroughly mixed and compounded, and, if desired, peppermint or other flavoring ingredient, and extract of the pond-lily or other flowers to give perfume to the mass added in small quantities, though this might be omitted. The whole compound is allowed to settle and clear, and is applied to the face or arms and hands by rubbing on the skin, which it serves to freshen and tone without having any deleterious or poisonous effects or obstructing perspiration from the skin, and which is not liable to spoil, the whisky having a preservative effect.

I do not restrict myself to the exact proportions of the ingredients herein stated, as these may be more or less changed.

Having thus fully described my invention, I claim as new and desire to secure by Letters Patent—

The within-described composition of matter for the treatment of the human skin, which consists of milk, ammonia, whisky, and soap, substantially as set forth.

PATRICK RION.

Witnesses:
F. DEGUNN,
A. L. THURNS.